Sept. 9, 1969    G. V. MOMMSEN    3,465,714
COATING MACHINE WITH IMPROVED WORK HOLDER
Original Filed Oct. 21, 1964    2 Sheets-Sheet 1

INVENTOR.
GORDON V. MOMMSEN
BY
Burd, MacEachron, Braddock,
Bartz & Schwartz
ATTORNEYS Sept. 9, 1969          G. V. MOMMSEN          3,465,714
COATING MACHINE WITH IMPROVED WORK HOLDER
Original Filed Oct. 21, 1964          2 Sheets-Sheet 2
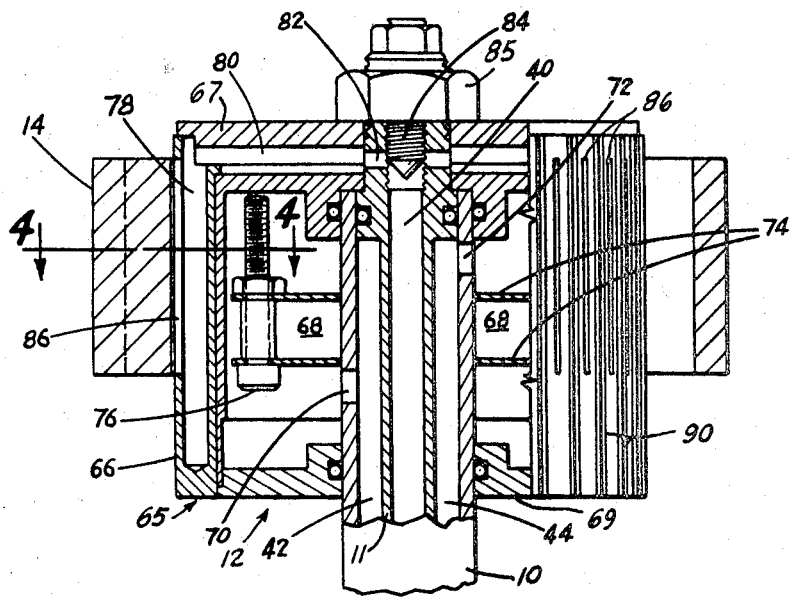
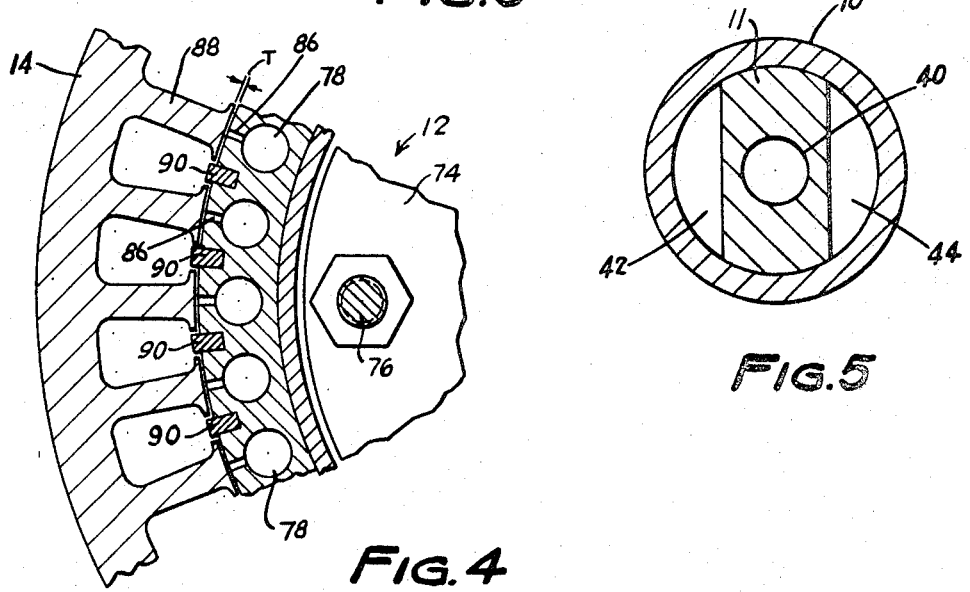
INVENTOR.
GORDON V. MOMMSEN
BY
Burd, MacEachron, Braddock,
Bartz & Schwartz
ATTORNEYS

# United States Patent Office 3,465,714
Patented Sept. 9, 1969

3,465,714
COATING MACHINE WITH IMPROVED WORK HOLDER
Gordon V. Mommsen, Minneapolis, Minn., assignor to Possis Machine Corporation, Minneapolis, Minn., a corporation of Minnesota
Original application Oct. 21, 1964, Ser. No. 405,336, now Patent No. 3,367,789, dated Feb. 6, 1968. Divided and this application Mar. 13, 1967, Ser. No. 622,537
Int. Cl. B05c *11/14*
U.S. Cl. 118—69        11 Claims

ABSTRACT OF THE DISCLOSURE

A machine for applying an insulating coating of thermosetting resin to selected portions of a heated workpiece, having a hollow mandrel on which the workpiece is supported during the coating operation. Air passages in the side wall of the mandrel having vents opening to the exterior of the mandrel to direct air adiabatically discharged therefrom, onto the surfaces of the heated workpiece from which the coating is to be excluded. The mandrel is cooled by the adiabatically discharging air and by a liquid coolant circulated through the interior of the mandrel.

---

This application is a division of U.S. application Ser. No. 405,336, filed Oct. 21, 1964, U.S. Patent No. 3,367,789.

In the design of coating machines of the type in which heated parts or workpieces, as for instance, electric motor stator cores, are sprayed with thermosetting resin powder to form an insulating coating thereon, it is mandatory that two problems be met and overcome. The first of these arises because the holder by which the heated part is held or on which it is supported becomes heated as a result of its contact with the heated workpiece which is being coated. As a result some of the powdered resin fuses onto the surfaces of the holder where it interferes with placement and removal of the workpieces. Accordingly, the holder has to be periodically cleaned which is time consuming and therefore costly.

The second problem stems from the fact that there are usually surfaces of the workpiece being coated from which the resinous coating must be excluded. This is especially so in the case of stator cores wherein the pole faces that define the bore of the stator should be kept free of coating while the closely adjacent surfaces of the coil receiving slots of the core are thoroughly coated. Previously this exclusion of coating from surfaces to be left uncoated has been attempted by physical masking as by rubber plugs or by air flow. It has been discovered that improved physical masking of critical areas can be achieved with hard masks if combined with air flow.

Briefly described, the coating machine of this invention has a work holder in which the surfaces that are contiguous to the heated workpiece are constantly cooled by adiabatic expansion of air and abstraction of heat therefrom by a liquid coolant circulated through the work holder. In the specific embodiment illustrated, the work holder comprises a hollow mandrel onto which the workpiece is placed. The side wall of the mandrel has air passages formed therein with vents leading from the passages and opening to the surface of the mandrel that oppose the areas of the workpiece from which the thermosetting resin coating is to be excluded. Adiabatic expansion of air issuing from the air vents cooperates with cooling liquid circulated through the interior of the mandrel to keep the contiguous surfaces of the mandrel and the workpiece relatively cool.

With these observations and objects in mind, the manner in which the invention achieves its purpose will be appreciated from the following description and the accompanying drawings. This disclosure is intended merely to exemplify the invention. The invention is not limited to the particular structure disclosed, and changes may be made therein which lie within the scope of the appended claims without departing from the invention.

The drawings illustrate one complete example of the physical embodiment of the invention constructed according to the best mode so far devised for the practical application of the principles thereof, and in which:

FIGURE 3 is a view on a larger scale, of the work holder, showing the same partly in elevation and partly in section, and with a workpiece, specifically a stator core, in position thereon;

FIGURE 4 is an enlarged fragmentary cross sectional view taken through FIGURE 3 on the plane of the line 4—4; and FIGURE 5 is a detail cross-sectional view taken on the plane of the line 5—5 in FIGURE 1.

Figure 2:
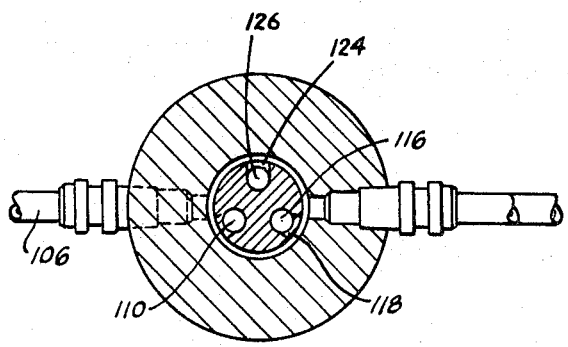
FIGURE 2 is a cross sectional view through FIGURE 1 on the plane of the line 2—2.

As will appear from the drawings, to which reference is now made, the invention is especially well adapted for use with coating machines designed for the application of heat fusible insulating material to certain portions or surfaces of electrical machines and specifically the coil supporting core members thereof. While such coating machines include structure not illustrated, since it forms no part of this invention, the portion of the machine that is involved in the invention is mounted on a table 8. Extending upwardly from the table 8 is a shaft 10 with a mandrel assembly 12 detachably mounted on the upper end thereof. The mandrel assembly supports the workpiece, here illustratively a stator core 14, in position to be coated with thermosetting resin powder projected from nozzles 15 and 16 as is customary in machines of this type, and as shown for instance in the Dosser Patent No. 3,247,004.

Shaft 10 is rotatably mounted at its lower end, which is somewhat enlarged in diameter, by being set into the bore of a tubular bearing assembly 18 equipped with bushings 20. The bearing assembly is secured to the underside of table 8 by screws 22 and includes an end cap 24 held in place by screws 25 and adapted to rotatably support a lever assembly 26. The lever assembly includes a stub shaft 28 which is fixed to the shaft 10 and has a lever arm 34 fixed thereto with a key 36.

A detent 38 positioned to react between the lever assembly 26 and the end cap 24 yieldingly holds the former and the shaft 10 with the mandrel 12 on the upper end thereof, in any one of a number of positions of rotation, for a purpose to be defined. The shaft 10 is tubular with a uniform internal diameter from end to end, and fixed inside the tubular shaft is a stem 11, the end portions of which are round and have a fluid-tight fit in the bore of the shaft 10. The lower end of the stem 11 protrudes from the bottom of the tubular shaft 10 and is threaded, as at 30, into a socket in the stub shaft 28, to thereby secure the shaft and stem to the lever assembly 26.

The stem 11 is also tubular to provide a central conduit 40 through the entire length of the shaft 10, and inwardly of its round end portions the stem is slabbed off at diametrically opposite sides to provide a pair of conduits 42 and 44. The conduit 40 which is closed at its lower end by a plug 32, provides means for supplying air under pressure to the mandrel assembly 12 and the conduits 42 and 44 cooperate to provide for circulation of liquid coolant through the mandrel assembly, the advantage of which will be clear as the description proceeds. Air is supplied to conduit 40 by a hose 48 which connects therewith via an annular recess 50 in the lower end of shaft 10 and an air inlet 52. Similarly, liquid coolant is supplied to conduit 42 by a hose 54 which is in communication therewith via an annular recess 56 in the lower end of shaft 10 and a coolant inlet 58. The coolant returns from the mandrel assembly via conduit 44 and is discharged through a hose 60 with which the conduit 44 connects through an annular recess 62 and a discharge outlet 64. As will be readily apparent, the annular recesses permit rotation of the shaft 10 without affecting the continuous transfer of air and coolant to the mandrel assembly.

The mandrel assembly comprises a mandrel 65 having a side wall 66 with an outer cylindrical boundary surface of a diameter slightly less than that of the bore of the stator core 14, so that the core, i.e. the workpiece to be coated, can be readily placed on the mandrel in position to be brought between the opposed nozzles 15–16 by appropriate rotation of the table 8.

Figure 1:
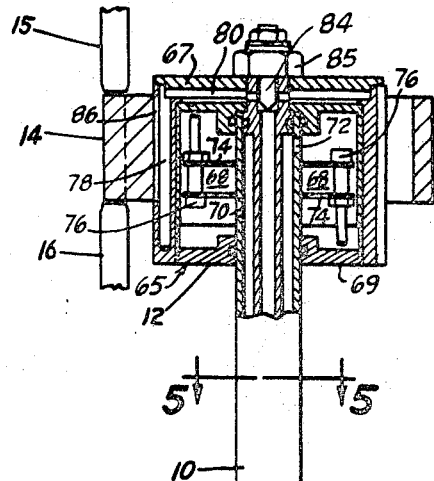
FIGURE 1 is a view, essentially in cross section of a coating machine equipped with the improved work holder of this invention.
Figure 1:
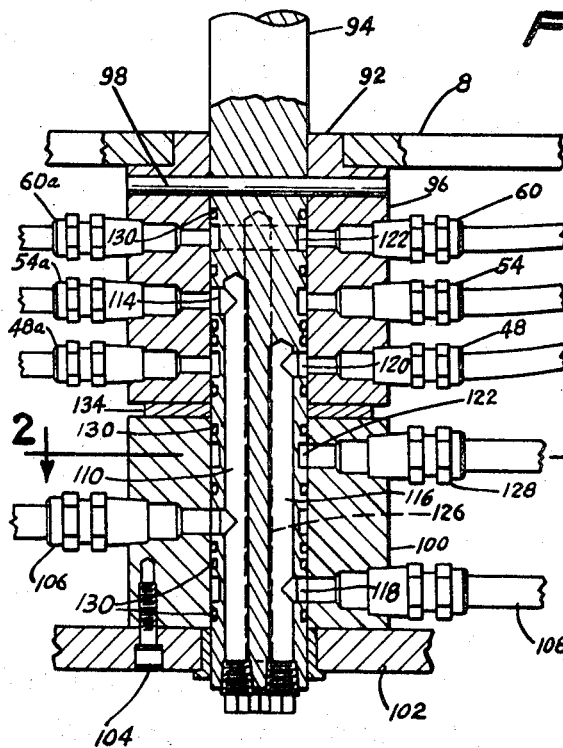

While the stator core can be properly positioned on the mandrel simply by reference to the nozzles 15–16, a conventional locating abutment (now shown) can be secured to the side wall of the mandrel to facilitate correct placement of the core; and where the machine is oriented as shown in FIGURE 1, with the shaft 10 and hence the axis of the mandrel vertical, such a locating abutment should be employed to support the core against sliding down on the mandrel. Ordinarily, though, the machine is placed with its shaft 10 horizontal, in which event the core will retain the position to which it is brought in placing the same on the mandrel.

The side wall 66 of the mandrel coacts with upper and lower end walls 67 and 69—appropriately joined thereto and with the upper end portion of the tubular shaft 10 which extends through the lower end wall 69, with a fluid-tight fit and has fluid-tight connection with the upper end wall 67—to define a closed liquid coolant chamber 68. Liquid coolant is supplied to the coolant chamber by the conduit 42 through a port 70 in the wall of the tubular shaft 10 and leaves the chamber 68 through a port 72 diametrically opposite and axially spaced from the port 70 to open into the return conduit 44.

Preferably a baffle comprising a pair of spaced plates 74, is located in the coolant chamber between the inlet and outlet ports 70–72, to preclude channeling and assure that the coolant will flow across the inner surface of the side wall 66. The baffle plates may be held in place in any suitable way, as for instance by oppositely projecting screws 76 to which the plates are attached with spacers therebetween.

The side wall 66 of the mandrel has a series of circumferentially spaced longitudinally extending air passages 78 formed therein, all of which have communication with a relatively flat circular cavity or manifold chamber 80 formed in the upper end wall 67, which in turn communicates with air conduit 40 via a plurality of ports 82. Accordingly, air introduced into the conduit 40 is free to enter all of the air passages 78 at equal pressure and at a flow rate that may be adjusted by a set screw 84 threaded into the upper end of conduit 40. Obviously many different sizes of mandrels may be employed with a given powder spraying machine and accordingly the air flow requirements will correspondingly vary. To enable substitution of one mandrel for another, the mandrel is removably held assembled with the shaft 10 by a nut 85 threaded onto the upper end of the stem 11.

Each of the air passages 78 has a vent 86 leading therefrom and opening to the cylindrical outer boundary surface of the mandrel. These vents, or at least the mouths thereof, are circumferentially equispaced so that at least one of them will be opposite each of the pole pieces 88 of the stator core 14.

The pole pieces 88 are of course formed by the coil receiving slots of the stator core and define the side walls of these slots, which—like the bottoms thereof—are to be coated with the heat fusible insulating material. The narrow gaps which constitute the mouths of the slots divide the bore of the stator core into a succession of separated pole faces, from which the coating is to be excluded. As best seen in FIGURE 4, it is these pole faces which oppose the mouths of the vents 86 and, to assure that the pole faces will be centered with respect to the vents 88, ribs 90 are set into the side wall 66 to project beyond the outer boundary surface thereof equidistant from the mouths of the vents for entry into the narrow gaps between the pole faces.

The air which debouches from the vents 86 thus impinges upon the pole faces medially of their edges, and then forms a blanket of air which flows through the slight clearance between the contiguous surfaces of the mandrel and the pole faces, indicated by the dimension T in FIGURE 4, as it exhausts into the atmosphere. This blanket of air masks and physically deflects particles of resin powder away from the pole faces and the contiguous outer boundary surface of the mandrel. As will be appreciated, the clearance or tolerance T between the pole faces of the stator core and the cylindrical outer boundary surface of the mandrel is very small and the accumulation of resin powder therebetween would inhibit smooth placement and removal of the core. It is therefore of utmost importance that these surfaces be kept clean.

Not only does the air physically deflect powder away from the surfaces on which it should not be deposited, it also expands adiabatically and, in so doing, significantly cools these surfaces.

The cooling effect resulting from the adiabatic expansion of the air together with the abstraction of heat from the mandrel by the liquid coolant circulated through the mandrel has been found to be extremely effective in keeping the temperature of the mandrel assembly and the contiguous pole faces of the stator core below the critical value at which the powdered thermosetting resin fuses.

It has also been found that the slight protrusion of the ribs 90 into the gaps between the pole faces effectively prevents the deposition of resinous powder on the edges of the pole faces and thus maintains slot width for ease in winding.

To simplify the disclosure, the invention has been described with reference to a single work station, i.e., only a single mandrel assembly is shown mounted on the table and in conjunction with only a single workpiece. However, the coating apparatus of the present invention is particularly useful when a multiplicity of work stations are provided. Accordingly, the table 8 may support several mandrel assemblies, all mounted and constructed in the manner described. These assemblies are normally arranged in a circle and the table is mounted for rotation to permit each mandrel assembly to be sequentially advanced to the nozzles 15 and 16 by which the coating material is applied to the heated workpieces placed on the mandrel assemblies To distribute the air and liquid required by each of the several work stations, a manifold assembly 92 is provided. The air supply and liquid circulating hoses 48, 54 and 60, as well as the comparable hoses that lead to the other mandrel assemblies and are represented by hoses 48a, 54a and 60a, all connect with the manifold assembly 92.

The manifold assembly 92 includes a main shaft 94 which is fixed to an upper rotatable hub 96 by means of pin 98. The hub 96 is suitably secured to the table and thus turns therewith. The shaft 94 projects from the bottom of the hub 96 and fits into a stationary bearing member 100 which is secured to a frame member 102 by screws 104.

In this manner the entire group of mandrel assemblies is mounted for rotation about the axis of the shaft 94, and preferably a thrust bearing 134 is interposed between the hub 96 and the bearing member 100.

Like the lower end portion of the shaft 10, the shaft 94 has a series of axially spaced annular recesses or grooves, three of which are above the thrust bearing 134 and hence open to the bore of the hub 96, and three of which are below the thrust bearing 134 and hence open to the bore of the stationary bearing 100. These annular recesses or grooves together with three bores that extend longitudinally up into the shaft 94 and are plugged at their lower ends—and various hoses—enable air under pressure and liquid coolant to be supplied to all of the several mandrel assemblies despite their rotation about the axis of the shaft 94.

Hose 106 supplies liquid coolant to the manifold assembly, and hose 108 which is connectible with a source of air under pressure (not shown) introduces pressurized air into the entire system. To convey the liquid coolant supplied by hose 106 to the hose 54 and to all similar hoses that lead to the other mandrel assemblies that are represented by hose 54a, the hose 106 connects with one of the longitudinal bores—namely, bore 110. The liquid coolant flows from the hose 106 into and upwards through bore 110, enters the annular recess 112 via outlet 114, and is distributed under equal pressure to all of the hoses 54 and 54a.

In the similar manner, the air under pressure that is supplied by hose 108, passes upwards through a second bore 116, enters annular recess 118 via outlet 120, and is distributed under equal pressure to all of the hoses 48 and 48a. The liquid coolant returning from the mandrel assemblies through hoses 60 and 60a enters annular recess 122, passes through outlet 124 into bore 126 and leaves the same through hose 128.

As is customary, O-ring seals, collectively identified by the numeral 130, are placed where necessary to prevent leakage and/or intermixing of the air and liquid coolant.

The operation of the machine of this invention is best understood by reference to the procedural steps which are sequentially performed during the coating of a stator core. After selection of a mandrel assembly of a size to fit the stator core which is to be coated, the selected mandrel assembly is placed upon the shaft 10 and secured in place by the nut 85. The heated stator core is then telescoped onto the mandrel with the ribs 90 occupying the gaps between the pole faces of the core. With the thermosetting resin powder issuing from the nozzles 15 and 16, one of the mandrel assemblies is positioned to interpose the stator core thereon between the nozzles, so that the powdered resin issuing from the nozzles strikes the opposite end faces of the core and enters the adjacent coil-receiving slot. The mandrel assembly is then rotatively indexed by means of the lever arm 34 to successively bring the coil-receiving slots into position to receive the resin.

As previously described, the adiabatic expansion of air debouching from the vents in the side wall of the mandrel and the circulation of liquid coolant through its interior, prevents fusion of resin on the mandrel and the pole faces of the core.

After the coating has been applied to the first stator core, the table 8 is indexed to bring the next mandrel assembly with a stator core thereon into proper position relative to the nozzles 15 and 16. As will be understood, the bearing 100 and the hoses connected thereto remain stationary while the shaft 94, the hub assembly 92 and the hoses connected thereto rotate with the table 8, such rotation being facilitated by the thrust bearing 134 interposed between the hub 96 and the bearing 100, and by a bushing 136 in which the lower end of shaft 94 is received.

What I claim is:

1. In a machine for applying a coating of thermosetting resin to certain surfaces of a heated workpiece while excluding the coating from adjacent surfaces of the workpiece, a holder by which the heated workpiece is held during application of the resin thereto, said holder being characterized by:

(A) a member having a work engaging wall with an outer boundary surface shaped to conform to the surfaces of the workpiece from which coating is to be excluded, and an imperforate opposite boundary surface;

(B) air passage means in said wall between said boundary surfaces thereof;

(C) air vents leading from said air passage means and opening to the outer boundary surface of the wall for directing air onto said surfaces of the workpiece from which coating is to be excluded;

(D) duct means connectible with a source of air under pressure and communicating with said air passage means for delivering air to the latter for adiabatic expansion from the mouths of said air vents; and (E) means for circulating a liquid coolant across said opposite boundary surface, whereby the adiabatic expansion of the air issuing from the air vents and the abstraction of heat by the liquid coolant together cool said work engaging wall and the contiguous surfaces of the workpiece.

2. In a machine for applying a coating of heat fusible insulating material to the hot surfaces of the coil receiving slots of heated stator cores while excluding the coating from the circumferentially spaced pole faces into which the bore of the stator core is divided by the narrow gaps forming the mouths of the slots and from the adjacent edge portions of said gaps, a holder by which the heated stator cores are supported during the coating operation, said holder comprising:

(A) a hollow mandrel onto which a core may be placed and through which a coolant may be circulated, the mandrel having a side wall with with a cylindrical outer boundary surface which is contiguous to the pole faces of a stator core placed on the mandrel, and an imperforate opposite boundary surface;

said side wall having air passage means formed therein and discharge vents leading from said air passage means with the mouths of the vents opening through said outer boundary surface so that air debouching therefrom impinges upon any surface opposite the mouths of the vents;

(B) core locating means on the mandrel to engage a stator core thereon and by such engagement hold the core so rotationally oriented with respect to the mandrel that each of its pole faces opposes at least one of said discharge vents, so that the air debouching from the mouths of the vents flows between the outer boundary surface of the mandrel and the contiguous pole faces and edge portions of the gaps to mask and cool the same and thereby prevent deposition of heat fusible insulating material thereon; and (C) duct means connectible with a source of air under pressure and communicating with said air passage means to supply pressurized air thereto.

3. The machine of claim 2, further characterized in that the mandrel has end walls which coact with its side wall to define a closed receiving chamber, and supply and discharge duct means opening to and from said chamber for circulating a fluid coolant therethrough to thereby cool the side wall of the mandrel and the air in said air passage means.

4. The machine of claim 2, wherein said core locating means comprises longitudinally extending circumferentially spaced parallel ribs projecting from the cylindrical boundary surface of the side wall of the mandrel in equispaced relation to the mouths of each pair of adjacent air discharge vents, to enter the gaps between pole faces of a stator core on the mandrel and coact with the air debouching from the vents in masking the pole faces and the adjacent edge portions of the gaps against deposition of heat fusible insulating material thereon.

5. The machine of claim 2, wherein said air passage means comprises a series of circumferentially spaced longitudinally extending air passages, one for each of the poles of the stator cores for which the mandrel is designed, and wherein said vents are narrow longitudinally extending slits in the side wall of the mandrel.

6. The machine of claim 5, wherein said core locating means comprises circumferentially spaced parallel longitudinally extending ribs projecting from the side wall of the mandrel for entry into the narrow gaps between pole faces of the stator.

7. The machine of claim 6, wherein there is only one vent forming slit for each air passage, and wherein the mouths of each pair of adjacent slits are equispaced from one of said ribs.

8. The machine of claim 2, wherein the mandrel has end walls joined to its side wall, said end walls having coaxial bores to receive a shaft, and one of said end walls having a manifold means leading from its bore to said air passage means in the side wall of the mandrel, said manifold means constituting part of said duct means.

9. The machine of claim 8, further characterized by a shaft received in the coaxial bores of the end walls, the shaft having a longitudinally extending air passage in open communication with the bore in said one end wall, and also forming part of said duct means.

10. The machine of claim 9, wherein the shaft has a fluid tight fit with the bore in each end wall, and the end and side walls of the mandrel coact to define a coolant receiving chamber, and wherein the shaft has separate coolant feed and return passages therein in addition to said longitudinally extending air passage, and ports communicating said feed and return passages with the coolant receiving chamber, so that a fluid coolant can be circulated through said coolant receiving chamber to cool the side wall of the mandrel and the air passage means therein.

11. The machine of claim 10, further characterized by baffle means in the coolant receiving compartment between the ports communicating it with the separate feed and return passages.

References Cited

UNITED STATES PATENTS

| | | | |
|---|---|---|---|
| 3,226,245 | 12/1965 | Dettling et al. | 118—503 X |
| 3,247,004 | 4/1966 | Dosser | 118—500 X |
| 3,261,707 | 7/1966 | Korski et al. | |
| 3,355,310 | 11/1967 | De Jean et al. | 118—319 X |
| 3,377,984 | 4/1968 | Mommsen et al. | |

ROBERT W. JENKINS, Primary Examiner

JOHN P. McINTOSH, Assistant Examiner

U.S. Cl. X.R.

118—500, 504